(12) United States Patent
Wu et al.

(10) Patent No.: US 12,388,345 B2
(45) Date of Patent: Aug. 12, 2025

(54) BUCK CONVERTER SYSTEM WITH AN ASYMMETRIC THRESHOLD VOLTAGE GATE DRIVE CIRCUIT DESIGN

(71) Applicant: Reed Semiconductor Corporation, Warwick, RI (US)

(72) Inventors: Wenkai Wu, East Greenwich, RI (US); Jialun Du, Powell, OH (US); Weidong Zhu, East Lyme, CT (US)

(73) Assignee: Reed Semiconductor Corporation, Warwick, RI (US)

( * ) Notice: Subject to any disclaimer, the term of this patent is extended or adjusted under 35 U.S.C. 154(b) by 341 days.

(21) Appl. No.: 17/934,749

(22) Filed: Sep. 23, 2022

(65) Prior Publication Data

US 2023/0299673 A1    Sep. 21, 2023

Related U.S. Application Data

(60) Provisional application No. 63/269,644, filed on Mar. 21, 2022.

(51) Int. Cl.
*H02M 1/00*    (2007.01)
*H02M 1/08*    (2006.01)
*H02M 1/088*    (2006.01)

(52) U.S. Cl.
CPC ....... *H02M 1/0048* (2021.05); *H02M 1/0051* (2021.05); *H02M 1/0054* (2021.05); *H02M 1/08* (2013.01); *H02M 1/088* (2013.01)

(58) Field of Classification Search
CPC ............. H02M 1/0048; H02M 1/0051; H02M 1/0054; H02M 1/08
See application file for complete search history.

(56) References Cited

U.S. PATENT DOCUMENTS

| | | | |
|---|---|---|---|
| 2006/0198178 A1* | 9/2006 | Kinsley | G11C 5/04 365/52 |
| 2008/0203991 A1* | 8/2008 | Williams | H02M 3/158 323/288 |
| 2014/0266112 A1* | 9/2014 | Cheng | H02M 3/156 323/282 |

* cited by examiner

*Primary Examiner* — Adolf D Berhane
*Assistant Examiner* — Afework S Demisse
(74) *Attorney, Agent, or Firm* — AP3 Law Firm PLLC

(57) ABSTRACT

A buck converter with an asymmetric threshold voltage of its gate drive circuit design for improving power efficiency while keeping the gate drive design simple.

8 Claims, 2 Drawing Sheets

BUCK CONVERTER SYSTEM WITH AN ASYMMETRIC THRESHOLD VOLTAGE GATE DRIVE CIRCUIT DESIGN

CROSS-REFERENCE TO RELATED APPLICATION

This application claims the benefit of priority of U.S. provisional application No. 63/269,644, filed 21 Mar. 2022, the contents of which are herein incorporated by reference.

BACKGROUND OF THE INVENTION

The present invention relates to DC-to-DC power converters and, more particularly, a buck converter system with an asymmetric threshold voltage.

Buck converters are widely used in power supply applications for processors, FPGA, ASIC, etc. For high current applications, a multiphase buck converter is typically adopted to increase the current capability.

A typical single phase buck converter configuration includes a high side MOSFET (HSFET) Q1 and low side MOSFET (LSFET) Q2, which are turned on and off alternatively to generate a square wave at a switching node, which is filtered by L and Cout to generate a quasi-DC voltage at Vout. The turn on and turn off of HSFET Q1 and LSFET Q2 are controlled by the gate driver circuit. In this typical design, the HSFET Q1 and LSFET Q2 are fabricated in the same process technology with the same turn on threshold voltage (Vt). When the HSFET VGS is higher than Vt_Q1, Q1 turns on, when the HSFET VGS is lower than Vt_Q1, Q1 turns off. The operation of Q2 is similar to the operation of Q1.

Current buck converters suffer from reduced efficiency due to high diode reverse recovery energy and on resistance. When designers try to reduce LSFET Vt to achieve lower on resistance, they must reduce the Vt for HSFET as well because the LSFET and HSFET have the same gate oxide thickness. When both LSFET and HSFET Vt are reduced, the buck converter usually suffers from gate "parasitic turn on" at high switching slew rates, causing MOSFET instantaneous failure or long-term reliability issues.

In recent years, the processing power requirement is getting higher, demanding high current for processors, FPGA, ASICs, etc. Thus, how to achieve higher efficiency with lower power loss becomes a critical problem to solve for buck converter designs.

As can be seen, there is a need for a buck converter system with an asymmetric threshold voltage for improving power efficiency while keeping the gate drive design simple.

By having asymmetric Vt for HSFET and LSFET, a simple gate drive design can be implemented to ensure safe switching (no gate parasitic turn on) while achieving higher power efficiency. The present invention proposes a new scheme of having asymmetric threshold voltage (Vt) for HSFET and LSFET. The LSFET is fabricated with a thinner gate oxide than the HSFET such that the threshold voltage of the LSFET is lower than the HSFET. LSFET with a threshold voltage closer to its body diode forward voltage would reduce diode reverse recovery loss during deadtime and reduce on resistance by having a stronger overdrive voltage of MOSFET (VGS-Vt), yielding a higher power efficiency. The HSFET remains a relatively high Vt for simplicity of gate drive design.

SUMMARY OF THE INVENTION

In one aspect of the present invention, a gate drive circuit for a DC-to-DC power converter, the gate drive circuit including: a high-side transistor having a high threshold voltage; and a low-side transistor having a low threshold voltage, wherein the low threshold voltage is approximately 20 to 50 percent lower than the high threshold voltage.

In another aspect of the present invention, the gate drive circuit further includes wherein the gate drive circuit is adapted to drive a gate capacitance of a switching device of the DC-to-DC power converter, wherein the high-side and low-side transistors each have one or more intrinsic body diodes, respectively, and wherein the low threshold voltage is closer to a forward voltage of the one or more intrinsic body diodes that the high threshold voltage, respectively, wherein the low threshold voltage is adapted so that a channel of the low-side transistor conducts a current instead of the one or more intrinsic body diode during deadtime, wherein said difference between in said threshold voltages consists of a thinner gate oxide of the low-side transistor relative to the high-side transistor, wherein each transistor is coupled to a turn-on switch operatively associated with a turn-off switch, respectively, and wherein the turn-off switch of the high-side transistor is configured to prevent parasitic turn on at negative currents and prevent the high-side transistor from entering avalanche during continuous mode, and wherein the turn-off switch of the high-side transistor is configured with an active control to enable prevention of said parasitic turn on and said entrance of avalanche.

In yet another aspect of the present invention, the method of controlling switching of a switching device of a DC-to-DC power converter, including the following: providing a gate drive circuit having: a high-side transistor having a high threshold voltage; and a low-side transistor having a low threshold voltage, wherein the low threshold voltage is approximately 20 to 50 percent lower than the high threshold voltage, wherein said difference between in said threshold voltages consists of a thinner gate oxide of the low-side transistor relative to the high-side transistor, and wherein each transistor is coupled to a turn-on switch operatively associated with a turn-off switch, respectively, and wherein the turn-off switch of the high-side transistor is configured to prevent parasitic turn on at negative currents and prevent the high-side transistor from entering avalanche during continuous mode.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides a buck converter with an asymmetric threshold voltage of its gate drive circuit design for improving power efficiency while keeping the gate drive design simple.

Figure 1:
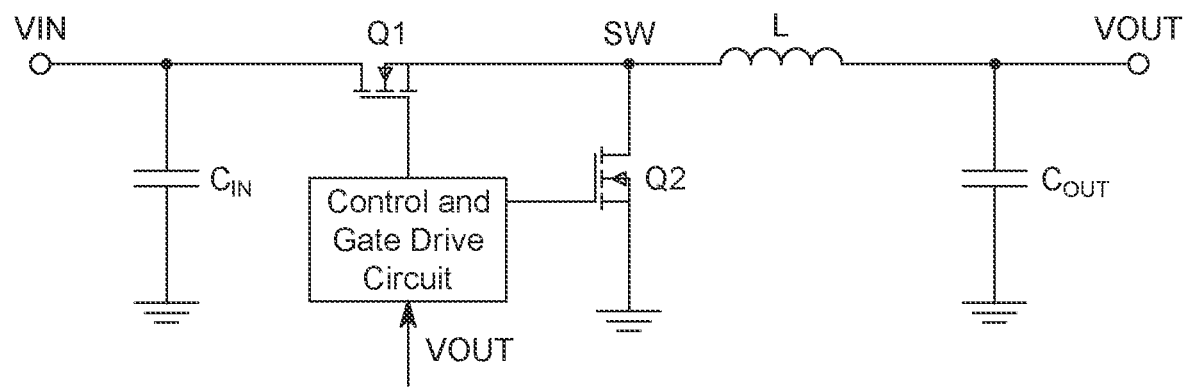
FIG. 1 is a schematic block diagram of a prior art single phase buck converter configuration.
Figure 2:
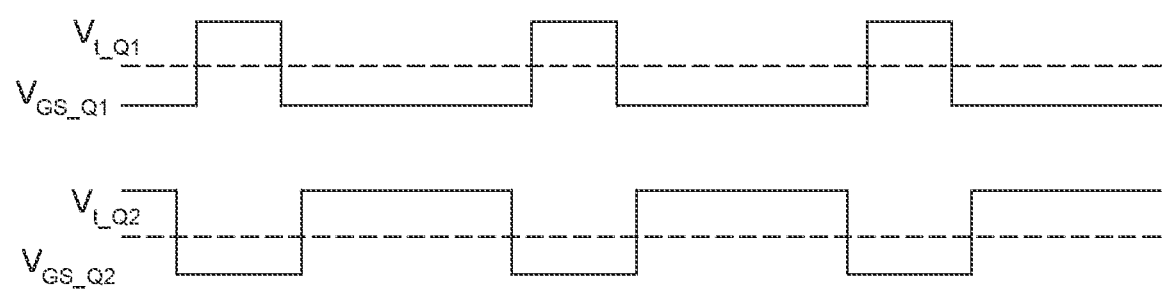
FIG. 2 illustrates various turn on/off waveforms within the FIG. 1 circuit.
Figure 3:
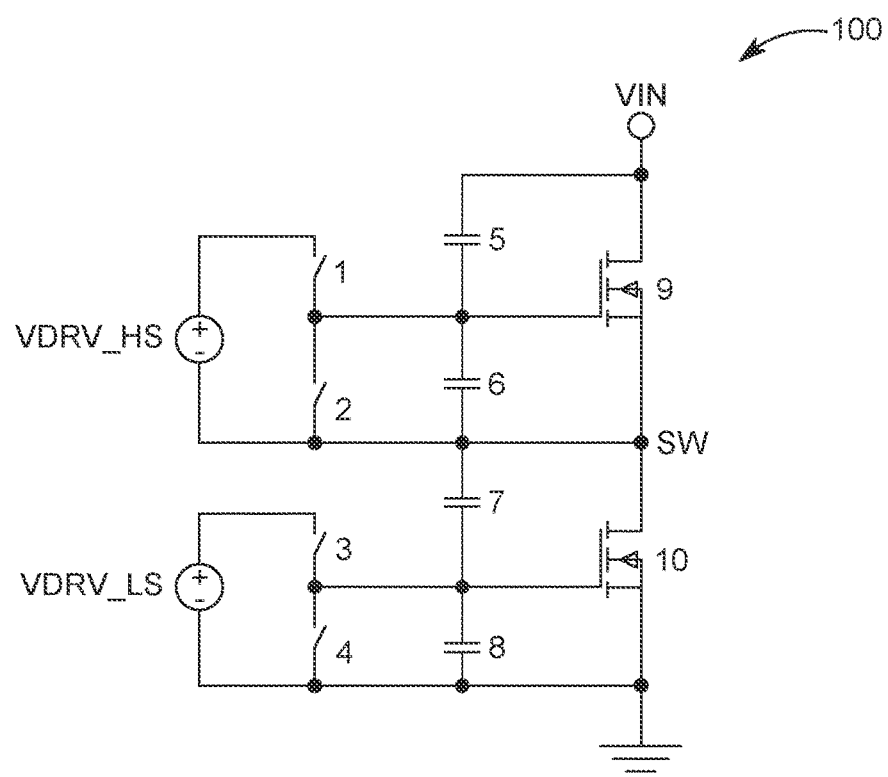
FIG. 3 is a schematic block diagram of an asymmetric buck converter in accordance with embodiments of the present invention, showing gate capacitance of MOSFETs therein.

Referring now to FIG. 3, the present invention may include a buck converter system 100 with an asymmetric Vt for HSFET (high-side FET) and LSFET (low-side FET). The buck converter system 100 includes the following systemic components.

1. S1_Q1
2. S2_Q1
3. S1_Q2
4. S2_Q2
5. Cgd_Q1
6. Cgs_Q1
7. Cgd_Q2
8. Cgs_Q2
9. Q1
10. Q2

FIG. 3 shows the proposed buck converter system 100 with asymmetric Vt for HSFET and LSFET. Connected between VIN and SW is HSFET (9) with a normal Vt. Connected between SW and ground is LSFET (10) with a lower Vt. HSFET driver pull up switch (1) connects between the high side power supply VDRV_HS and the HSFET (9) gate. HSFET driver pull down switch (2) connects between the HSFET (9) gate and the HSFET (9) source. LSFET driver pull up switch (3) connects between the low side power supply VDRV_LS and the LSFET (10) gate. LSFET driver pull down switch (4) connects between the LSFET (10) gate and the LSFET (10) source. Cgd_Q1 (5) is the parasitic capacitances from HSFET (9) drain to gate. Cgs_Q1 (6) is the parasitic capacitances from HSFET (9) gate to source. Cgd_Q2 (7) is the parasitic capacitances from LSFET (10) drain to gate. Cgs_Q2 (8) is the parasitic capacitances from LSFET (10) gate to source.

When HSFET (9) is off and LSFET (10) is on, the load current flows through the LSFET (10). A lower Vt for LSFET would yield a higher overdrive voltage of MOSFET (VGS-Vt) and a lower on resistance (Rdson). A lower LSFET on resistance can reduce the conduction loss during low side on time and improve the overall power efficiency.

A lower Vt for LSFET would also reduce the diode reverse recovery loss during deadtime. For a conventional buck converter with a normal Vt LSFET, when both LSFET (10) and HSFET (9) are off during positive current (inductor current flows from VIN to VOUT), the LSFET (10) body diode would turn on and help conduct the current. When HSFET (9) turns on, extra energy is needed to reversely bias the LSFET body diode. This diode reverse recovery energy plays a significant role in buck converter power loss. For LSFET with a lower Vt, the channel conducts the current instead of the body diode during deadtime. Thus, when HSFET turns on, the diode reverse recovery energy is saved.

The gate drive switches (1) (2) (3) (4) should be designed properly to ensure safe switching with maximized power efficiency.

Switch (1) should be strong enough to ensure fast HSFET turn on to minimize the switching loss, but not too strong to cause LSFET (10) to enter avalanche during normal operating conditions.

Switch (2) should be strong enough to ensure fast HSFET turn off to minimize the switching loss. A strong switch (2) is also desired to prevent HSFET parasitic turn on at negative currents. However, the switch (2) cannot be too strong to cause HSFET (9) to enter avalanche during normal operating conditions. Due to the above tight requirements, the design for switch (2) can be complicated that may require active control based on operating conditions. A HSFET with normal Vt can provide more margin for switch (2) design because a higher Vt would make HSFET parasitic turn on at negative currents less likely to happen. Therefore, the HSFET remains normal Vt while the LSFET prefers a lower Vt.

Switch (3) should be strong enough to ensure fast LSFET turn on to decrease the falling edge deadtime, but not too strong to cause HSFET (9) to enter avalanche during negative currents.

Switch (4) should be strong enough to ensure no parasitic LSFET turn on when HSFET turns on at positive current, but not too strong to cause LSFET to enter avalanche during negative currents.

Figure 4:
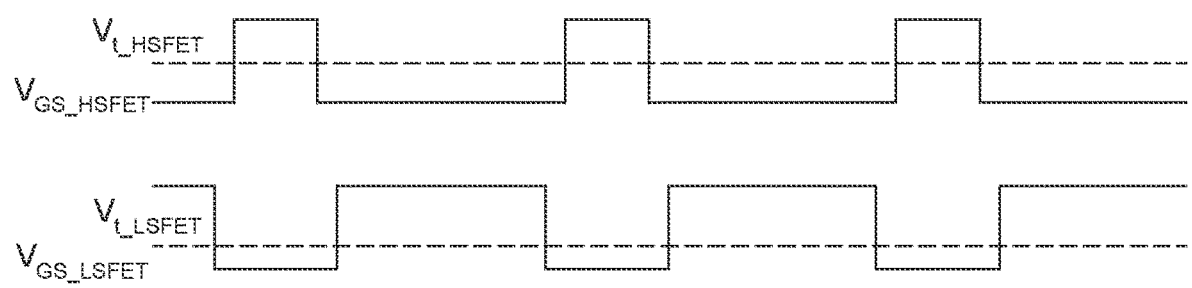
FIG. 4 illustrates various turn on/off waveforms with asymmetric Vt within the FIG. 3 circuit.

The VGS switching behavior for HSFET (9) and LSFET (10) with asymmetric Vt is illustrated in FIG. 4.

A method of manufacturing the present invention may include the following. In addition to the gate drive switch design described above, a silicon design should also ensure no shoot through at any operation conditions by proper control logic design. The LSFET (10) should have a thinner gate oxide than the HSFET (9) such that the threshold of LSFET (10) is lower than that of HSFET (9). Active gate drive control can be added to control the MOSFET switching more precisely. This can further improve the buck converter robustness and efficiency at the cost of design complexity. For example, at heavy load condition, the strength of switch (1) and (2) can be reduced to prevent LSFET avalanche. Precise deadtime control can be added to minimize deadtime and provide better efficiency but is optional.

The proposed asymmetric Vt buck converter is not limited to a lower Vt LSFET and a higher Vt HSFET. If need, in a different application, higher Vt on LSFET and lower Vt on HSFET can be used to achieve better performance.

A method of using the present invention may include the following. The buck converter system 100 disclosed herein is provided. A user would need to slightly modify their power stage gate drive design by following the design procedure described above. Then one would need to perform proper design and layout to have a fully functional power stage or POL product. To make the present invention functional, one would need to follow at least the previous elements/steps that have been identified as required. It is strongly recommended that one follows the optional elements/steps as well to achieve the best performance of this invention. Finally, one would need to find a trusted semiconductor manufacturer to fabricate the product.

Also, the present invention may be used for a buck converter and a power stage for multiphase converters.

As used in this application, the term "about" or "approximately" refers to a range of values within plus or minus 10% of the specified number. And the term "substantially" refers to up to 90% or more of an entirety.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down,"

and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A DC-to-DC buck converter comprising:
   a high-side transistor having a first threshold voltage; and
   a low-side transistor having a second threshold voltage, wherein the second threshold voltage is lower than the first threshold voltage, and wherein each transistor is coupled to a turn-on switch operatively associated with a turn-off switch, respectively, and wherein the turn-off switch of the high-side transistor is configured to prevent parasitic turn on at negative currents and prevent the high-side transistor from entering avalanche during continuous mode.

2. The DC-to-DC buck converter of claim 1, wherein a gate drive circuit is adapted to drive a gate capacitance of a switching device of the DC-to-DC buck converter.

3. The DC-to-DC buck converter of claim 1, wherein the high-side and low-side transistors each have one or more intrinsic body diodes, respectively, and wherein the second threshold voltage is closer to a forward voltage of the one or more intrinsic body diodes that the first threshold voltage, respectively.

4. The DC-to-DC buck converter of claim 3, wherein the second threshold voltage is adapted so that a channel of the low-side transistor conducts a current instead of the one or more intrinsic body diode during deadtime.

5. The DC-to-DC buck converter of claim 1, wherein said difference between in said threshold voltages consists of a thinner gate oxide of the low-side transistor relative to the high-side transistor.

6. The DC-to-DC buck converter of claim 1, wherein the turn-off switch of the high-side transistor is configured with an active control to enable prevention of said parasitic turn on and said entrance of avalanche.

7. A method of controlling switching of a switching device of a DC-to-DC buck converter, comprising:
   providing a power stage comprising:
      a high-side transistor having a first threshold voltage; and
      a low-side transistor having a second threshold voltage, wherein the second threshold voltage is lower than the first threshold voltage, and wherein each transistor is coupled to a turn-on switch operatively associated with a turn-off switch, respectively, and wherein the turn-off switch of the high-side transistor is configured to prevent parasitic turn on at negative currents and prevent the high-side transistor from entering avalanche during continuous mode.

8. The method of claim 7, wherein said difference between in said threshold voltages consists of a thinner gate oxide of the low-side transistor relative to the high-side transistor.

* * * * *